(12) United States Patent
Cote et al.

(10) Patent No.: US 8,776,158 B1
(45) Date of Patent: Jul. 8, 2014

(54) ASYNCHRONOUS SHIFTING WINDOWS CACHING FOR FORWARD AND BACKWARD VIDEO STREAMING

(75) Inventors: Dominique Cote, Boston, MA (US); Xiaoye Jiang, Shrewsbury, MA (US); Sorin Faibish, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 1299 days.

(21) Appl. No.: 12/570,685

(22) Filed: Sep. 30, 2009

(51) Int. Cl.
 H04N 7/173 (2011.01)
 H04N 21/232 (2011.01)
 H04N 21/231 (2011.01)

(52) U.S. Cl.
 CPC ....... *H04N 21/232* (2013.01); *H04N 21/23106* (2013.01); *H04N 21/2323* (2013.01)
 USPC .......................................... 725/116; 725/134

(58) Field of Classification Search
 CPC ............ H04N 21/232; H04N 21/2323; H04N 21/23106; H04N 21/2326
 USPC ........... 725/134, 142, 94, 115, 145, 116, 146, 725/93
 See application file for complete search history.

(56) References Cited

U.S. PATENT DOCUMENTS

| | | | |
|---|---|---|---|
| 5,381,539 A | 1/1995 | Yanai et al. |
| 5,544,313 A | 8/1996 | Shachnai et al. |
| 5,586,264 A | 12/1996 | Belknap et al. |
| 5,629,732 A | 5/1997 | Moskowitz et al. |
| 5,630,067 A | 5/1997 | Kindell et al. |
| 5,636,139 A | 6/1997 | McLaughlin et al. |
| 5,737,747 A | 4/1998 | Vishlitzky et al. |
| 5,774,660 A | 6/1998 | Brendel et al. |
| 5,774,714 A | 6/1998 | Thapar et al. |
| 5,781,801 A | 7/1998 | Flanagan et al. |
| 5,829,046 A | 10/1998 | Tzelnic et al. |

(Continued)

FOREIGN PATENT DOCUMENTS

WO   WO 00/60861 A1   10/2000

OTHER PUBLICATIONS

Uresh Vahalia, Unix Internals: The New Frontiers, Chapter 9, pp. 261-289, 1996, Prentice Hall, Inc., Simon & Schuster, Upper Valley River, New Jersey 07458.

(Continued)

*Primary Examiner* — Pankaj Kumar
*Assistant Examiner* — Usha Raman
(74) *Attorney, Agent, or Firm* — Richard Auchterlonie; Novak Druce Connolly Bove + Quigg LLP

(57) ABSTRACT

Three contiguous segments of video data are kept in video cache memory for streaming video data to a host application from a video file in data storage. For example, three buffers are allocated in the cache memory for each video stream, and at any given time during sequential access, a particular one of the three buffers is a middle buffer from which pre-fetched data is streamed to the host application. For forward or backward streaming, the buffers also include a backward buffer as well as a forward buffer on opposite sides of the middle buffer. In order to simplify the assembling of the buffers, a shift or rotation of the roles of the buffers and an asynchronous pre-fetch for continuance of a stream or for a switched direction of a stream is triggered by the cache state of the offset requested by the video application.

5 Claims, 8 Drawing Sheets

(56) References Cited

U.S. PATENT DOCUMENTS

| | | | |
|---|---|---|---|
| 5,892,915 | A | 4/1999 | Duso et al. |
| 5,933,603 | A | 8/1999 | Vahalia et al. |
| 5,944,789 | A | 8/1999 | Tzelnic et al. |
| 5,974,503 | A | 10/1999 | Venkatesh et al. |
| 5,987,621 | A | 11/1999 | Duso et al. |
| 6,061,504 | A | 5/2000 | Tzelnic et al. |
| 6,128,701 | A | 10/2000 | Malcolm et al. |
| 6,230,200 | B1 | 5/2001 | Forecast et al. |
| 6,526,225 | B1 * | 2/2003 | Windrem et al. ............. 386/265 |
| 6,625,750 | B1 | 9/2003 | Duso et al. |
| 6,792,047 | B1 | 9/2004 | Bixby et al. |
| 6,871,006 | B1 | 3/2005 | Oguz et al. |
| 6,877,044 | B2 | 4/2005 | Lo et al. |
| 6,907,081 | B2 | 6/2005 | Mantchala et al. |
| 6,937,770 | B1 | 8/2005 | Oguz et al. |
| 6,959,116 | B2 | 10/2005 | Sezer et al. |
| 6,968,091 | B2 | 11/2005 | Faibish et al. |
| 6,980,594 | B2 | 12/2005 | Wang et al. |
| 7,023,924 | B1 | 4/2006 | Keller et al. |
| 7,096,481 | B1 | 8/2006 | Forecast et al. |
| 7,174,561 | B2 | 2/2007 | Bixby et al. |
| 7,272,602 | B2 | 9/2007 | Moulton |
| 7,444,662 | B2 | 10/2008 | Faibish et al. |
| 7,526,623 | B1 | 4/2009 | Rao |
| 7,529,806 | B1 * | 5/2009 | Shteyn .......................... 709/217 |
| 2007/0055702 | A1 | 3/2007 | Fridella et al. |
| 2007/0260842 | A1 | 11/2007 | Faibish et al. |
| 2008/0005468 | A1 | 1/2008 | Faibish et al. |
| 2009/0292819 | A1 * | 11/2009 | Kandekar et al. ............. 709/231 |

OTHER PUBLICATIONS

"Delivering on the Promise of Internet Streaming Media," v1.0, pp. 1-15, Oct. 2000, CacheFlow Inc., Sunnyvale, CA.

"Streaming Media Optimization with CacheFlow Internet Caching Appliances," pp. 1-15, Jun. 11, 2001, CacheFlow, Inc., Sunnyvale, CA.

P. Venkat Rangan and Harrick M. Vin, "Designing File Systems for Digital Video and Audio," pp. 81-94, 1991, Multimedia Laboratory, University of California, Dept. of Computer Science and Engineering, La Jolla, CA.

Huanxu Pan, Lek Heng Ngoh, and Aurel A, Lazar, "A Time-Scale Dependent Disk Scheduling Scheme for Multimedia-on-Demand Servers," pp. 572-579,1996, IEEE, New York, NY.

Divyesh Jadav, Chutimet Srinilta, Alok Choudhary, P. Bruce Berra, "Design and Evaluation of Data Access Strategies in a High Performance Multimedia-on-Demand Server," pp. 286-291,1995, IEEE, Syracuse, NY.

David C. Steere, James J. Kistler, M. Satyanarayanan, "Efficient User-Level File Cache Management on the Sun Vnode Interface," pp. 325-331, Jun. 11-15, 1990,USENIX Summer Conference, Anaheim, California.

David P. Anderson, Yoshitomo Osawa and Ramesh Govindan, "A File System for Continuous Media," ACM Transactions on Computer Systems, vol. 10, No. 4, pp. 311-337, Nov. 1992, Association for Computing Machinery, Inc., New York, New York 10121.

Render Farms, 2 pages, printed Jul. 17, 2009, Archiform Ltd., Miami. Florida, 33131.

* cited by examiner

ASYNCHRONOUS SHIFTING WINDOWS CACHING FOR FORWARD AND BACKWARD VIDEO STREAMING

FIELD OF THE INVENTION

The present invention relates to video data processing, and in particular, pre-fetching and caching of video data streamed to a host application from a video file in a storage array.

BACKGROUND OF THE INVENTION

For more than a decade, there have been video file servers using an admissions control policy, task scheduling, caching, and pre-fetching for delivering isochronous streams of video data for viewing of the video data in real time. See, for example, Vishlitzky et al. U.S. Pat. No. 5,737,747 issued Apr. 7, 1998, and Vahalia et al. U.S. Pat. No. 5,933,603, issued Aug. 3, 1999. Such a video file server includes a cached disk array storage subsystem and a plurality of stream server computers linking the cached disk storage array to a data network for the transfer of video data streams. The cached disk storage subsystem is responsive to video pre-fetch commands, and the data specified for a pre-fetch command for a process is retained in an allocated portion of the cache memory from the time that the cached disk storage subsystem has responded to the pre-fetch command to the time that the cached disk storage subsystem responds to a fetch command specifying the data for the process. The time between pre-fetching and fetching is selected based on available disk and cache resources. The video file server provides video-on-demand service by maintaining and dynamically allocating sliding windows of video data in the random access memories of the stream server computers.

More recently the introduction of high definition (HD) video has resulted in a significant increase in "dropped frames" when HD video has been streamed from video file servers originally designed streaming standard definition (SD) video. At lower SD bit-rates the problem can be solved by using caching mechanisms in the storage arrays to hide any possible high latency I/Os that can result in dropped frames when no buffering is used. On the other hand pre-fetch mechanisms like read-ahead and write-behind can hide high disk latencies up to a certain limit, e.g. up to a certain bit rate most probably not high enough for uncompressed HD streams running at 150-200 MB/sec.

The problem becomes more difficult in cases where different video streams are fed concurrently to multiple host applications from same storage array. In this latest case the read-ahead and pre-fetch mechanisms of the storage array cache are less efficient as the access to the storage becomes random and the disk seek times increase resulting in an increased latency and a higher probability to have long disk response times. A cache trashing effect occurs when the storage array has to throw or discard cached data as a result of cache misses, causing the storage access latencies to increase and more frames to be dropped. In short, the storage array can still deliver the required HD throughputs, but cannot guarantee the instantaneous throughput required, and the result is that frames are dropped as decoders try to compensate for higher response times than the duration of decoding a frame.

Attempts to reduce dropped frames when delivering HD throughputs have included using more cache memory in the video server or in the video decoders for further read ahead or write-behind to compensate for higher storage latencies, and the use of very large File System blocks increasing with sequential access. If this caching is sufficient to ensure smooth playout, however, there are large latencies up to 500 msec.

The most advanced video servers include a metadata server in a shared storage architecture. The metadata server allocates the data blocks and builds bitmaps and manages metadata of a shared file system. Each host computer directly accessing the storage array obtains access rights and metadata from the metadata server using a File Mapping Protocol (FMP). See, for example, Fridella et al. U.S. Patent Application Pub. 2007/0055702 A1 published Mar. 8, 2007, incorporated herein by reference, for details regarding the File Mapping Protocol, and Faibish et al. U.S. Patent Application Publication 2007/0260842 A1 published Nov. 8, 2007, incorporated herein by reference, for details regarding layout of the file system on disk to enhance I/O performance.

The most advanced video servers, however, are challenged by new video applications, such as rendering farms, which may consume multiple streams of uncompressed HD video at rates higher than the usual rate for human viewing. Rendering farms are now synthesizing video animations and virtual environments for diverse applications such as cartoon and movie making for entertainment and advertising, accident reconstruction for litigation support, simulations for industrial design and engineering, and architectural rendering for virtual property tours.

SUMMARY OF THE INVENTION

A study of the "dropped frame" problem for rendering farms built on the most advanced video servers has revealed that a relatively high number of the dropped frames occurs when the sequential access by a rendering application is in a backward direction with respect to the extent of a video file in comparison to a forward direction. Also a relatively high number of dropped frames occurs during a switch of a rendering application between forward sequential access and backward sequential access of a video file. The backward sequential access may require disk access speeds up to double the bit rate of the HD stream. For example, for 165 MB/sec backward playout, the storage throughput may be as high as 330 MB/sec. If the storage array bandwidth is limited, then this will result in dropped frames as the storage array cannot keep-up with the demand of the streaming of video data from data storage to the rendering application.

In addition, neither the traditional video servers nor the most advanced video servers correlate storage latencies and video caching mechanisms in an adaptive manner that substantially reduces the impact of "dropped frames" when switching between different spaced forward sequential access steams for a traditional HD video application as well as between forward sequential access and backward sequential access for a rendering farm. In the most advanced servers, latency in the disk access also impacts the operation of the metadata server due to sharing of some storage array resources between servicing of the metadata server and the streaming of video data from data storage to the video application.

In accordance with a basic aspect of the invention, these latency issues, up to a certain time, are resolved by a video stream caching mechanism that hides the storage and network latencies regardless of the direction of playback (forward or backward) and regardless of gaps between streams of sequential access (forward or backward). This is done by keeping three contiguous segments of video data in video cache memory for streaming the video data to a host application from a video file in data storage. For example, three buffers are allocated in the cache memory for each video stream from a file to a host application, and at any given time during sequential access, a particular one of the three buffers is a middle buffer from which pre-fetched data is streamed to the host application. Because the host application may request video data going backward as well as forward, the buffers also include a backward buffer as well as a forward buffer on opposite sides of the middle buffer.

To absorb the storage and network latencies, data is pre-fetched asynchronously from storage and loaded into the forward or backward buffer as appropriate for continuance of a sequential stream by the forward or backward buffer assuming the role of the middle buffer. For example, while the middle buffer is serving cached data to the video application in a forward stream, therefore incurring no latencies, an asynchronous process such as an asynchronous thread is loading the forward buffer and can afford to incur some latency, up to a certain maximum value defined by the size of the buffers, which in turn is defined by the worst case scenario for the storage latency. This is possible since the video data that is being requested by the video application, from the storage, is not required to be played immediately, but only at a certain point in the future. In order to simplify the assembling of the buffers, a shift or rotation of the roles of the buffers and an asynchronous pre-fetch for continuance of a stream or for a switched direction of a stream is triggered by the cache state of the offset requested by the video application. This shift or rotation of the roles of the buffers also allows for pseudo-random access patterns and gaps between sequential access as well as switching of direction of sequential access.

In accordance with one aspect, the invention provides a computer-implemented method of operating a video cache memory for forward playback and backward playback of video data to a host application from a video file in a storage array. The method includes fetching a first segment of data from the video file in the storage array and storing the first segment of data in the video cache memory. The method further includes fetching a second segment of data from the video file in the storage array and storing the second segment of data in the video cache memory, the second segment of data being contiguous with and following the first segment of data in the video file. The method further includes fetching a third segment of data from the video file in the storage array and storing the third segment of data in the video cache memory, the third segment of data being contiguous with and preceding the first segment of data in the video file. The method further includes, after the fetching of the first, second, and third segments of data from the video file in the storage array and the storing of the first, second, and third segments of data in the video cache memory, receiving from the host application a request for data from the video file beginning at a specified offset in the video file, and responding to the request for data by searching the cache memory for data from the video file at the specified offset in the video file and finding that the data from the video file at the specified offset is in the third segment of data in the video cache memory, and in response to finding that the data from the video file at the specified offset is in the third segment of data in the video cache memory, returning data from the third segment of data in the video cache memory to the host application and fetching a fourth segment of data from the video file in the storage array and storing the fourth segment of data from the video file in the video cache memory, the fourth segment of data being contiguous with and preceding the third segment of data in the video file.

In accordance with another aspect, the invention provides a computer-implemented method of operating a host computer in a data processing system including the host computer and a storage array coupled to the host computer for servicing storage access requests from the host computer. The host computer has a cache memory and is programmed with a video application and a video file manager. The computer-implemented method includes operating the host computer for forward and backward playback of video dated to the video application from a video file in the storage array. The method includes the video file manager fetching a first segment of data from the video file in the storage array and storing the first segment of data in the cache memory; the video file manager fetching a second segment of data from the video file in the storage array and storing the second segment of data in the cache memory, the second segment of data being contiguous with and following the first segment of data in the video file; and the video file manager fetching a third segment of data from the video file in the storage array and storing the third segment of data in the cache memory, the third segment of data being contiguous with and preceding the first segment of data in the video file. The method further includes, after the fetching of the first, second, and third segments of data from the video file in the storage array and the storing of the first, second, and third segments of data in the cache memory, the video file manager receiving, from the video application, a request for data from the video file beginning at a specified offset in the video file, and the video file manager responding to the request for data by searching the cache memory for data from the video file at the specified offset in the video file and finding that the data from the video file at the specified offset is in the third segment of data in the cache memory, and in response to finding that the data from the video file at the specified offset is in the third segment of data in the cache memory, returning data from the third segment of data in the cache memory to the video application and fetching a fourth segment of data from the video file in the storage array and storing the fourth segment of data from the video file in the cache memory, the fourth segment of data being contiguous with and preceding the third segment of data in the video file.

In accordance with a final aspect, the invention provides a data processing system including a host computer and a storage array coupled to the host computer for servicing storage access requests from the host computer. The host computer has a cache memory and is programmed with a video application and a video file manager. The video file manager is executable by the host computer for: fetching a first segment of data from the video file in the storage array and storing the first segment of data in the cache memory; fetching a second segment of data from the video file in the storage array and storing the second segment of data in the cache memory, the second segment of data being contiguous with and following the first segment of data in the video file; fetching a third segment of data from the video file in the storage array and storing the third segment of data in the cache memory, the third segment of data being contiguous with and preceding the first segment of data in the video file; and after the fetching of the first, second, and third segments of data from the video file in the storage array and the storing of the first, second, and third segments of data in the cache memory, for receiving, from the video application, a request for data from the video file beginning at a specified offset in the video file, and for responding to the request for data by searching the cache memory for data from the video file at the specified offset in the video file and finding that the data from the video file at the specified offset is in the third segment of data in the cache memory, and in response to finding that the data from the video file at the specified offset is in the third segment of data in the cache memory, for returning data from the third segment of data in the cache memory to the video application and fetching a fourth segment of data from the video file in the storage array and storing the fourth segment of data from the video file in the cache memory, the fourth segment of data being contiguous with and preceding the third segment of data in the video file.

BRIEF DESCRIPTION OF THE DRAWINGS

Additional features and advantages of the invention will be described below with reference to the drawings, in which.

Figure 1:
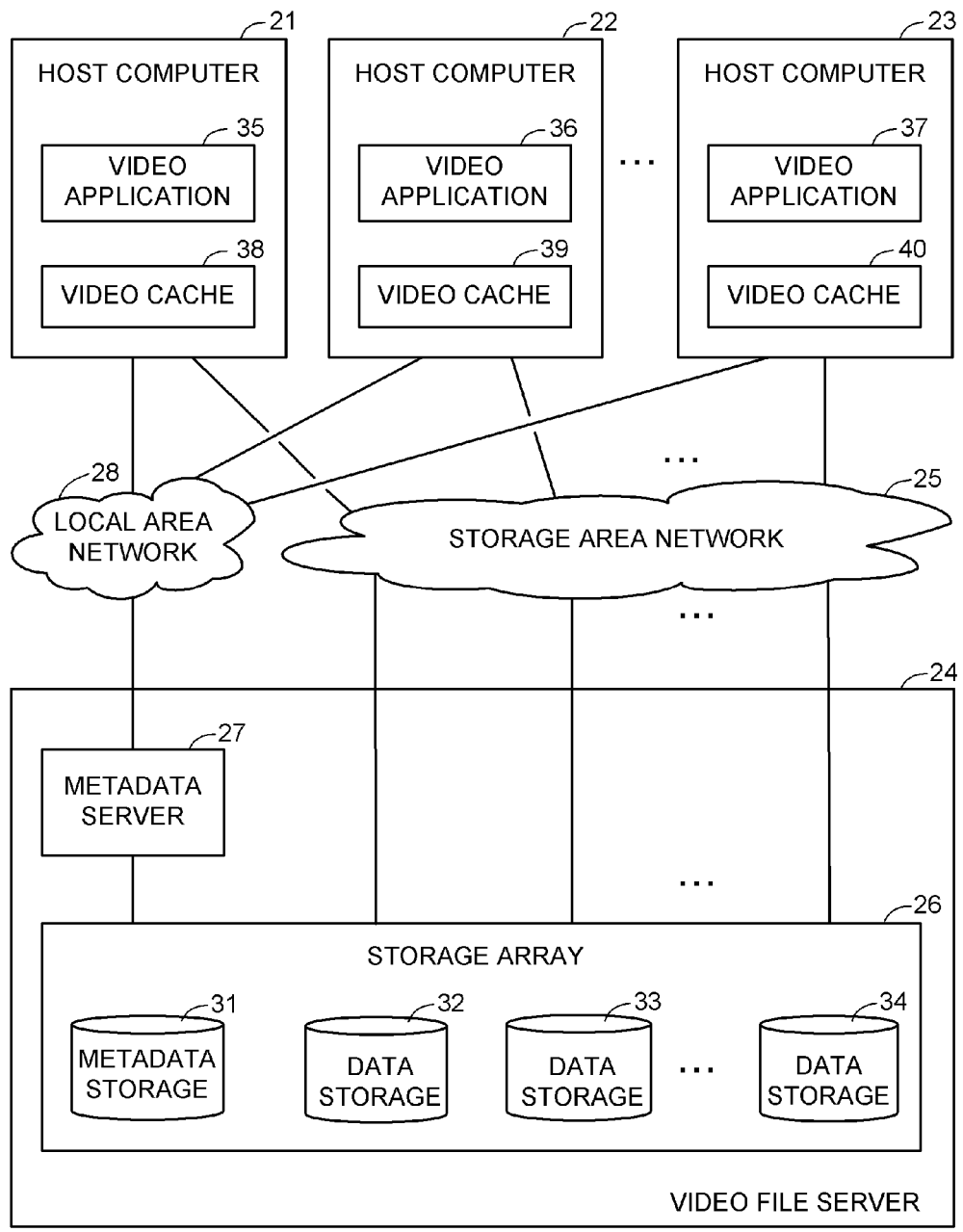
FIG. 1 is block diagram of a data processing system including multiple host computers sharing a video file server.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown is block diagram of a data processing system including multiple host computers 21, 22, 23 sharing a video file server 24. The host computer 21, 22, 23 are linked to the video file server 24 through a storage area network (SAN) 25 for passing storage access requests from the host computers to a storage array 26 of the video file server, and for returning streams of video data from the storage array 26 to the host computers. The storage array network 25 may use any one or more of storage connection technologies, such as Fibre Channel (FC) or Gigabit Ethernet, and storage access protocols, such as Fibre Channel (FC), SCSI, or internet SCSI (iSCSI).

The video file server 24 also includes a metadata server 27 for allocating data blocks of the storage array 26 and building bitmaps and managing metadata of a shared file system distributed over the metadata storage 31 and data storage 32, 33, 34. For example, the metadata server 27 is a high-end commodity computer. The data processing system of FIG. 1 also includes a local area network (LAN) 28 interconnecting each of the host computers 21, 22, 23 to the metadata server 27 for receiving metadata requests from the host computers and for responding to the metadata requests by returning metadata to the host computers. The local area network (LAN) 28, for example, is an Ethernet network using an Internet Protocol (IP) such as the Transmission Control Protocol (TCP).

The storage array 26 includes metadata storage 31 for the metadata server 37, and data storage 32, 33, 34 shared among the host computers 21, 22, 23. The storage array 26, for example, is a cached disk array including a redundant array of inexpensive disks (RAID).

Each of the host computers 21, 22, 23 has at least one video application program 35, 36, 37 and a respective video cache 38, 39, 40 for caching video data streamed from the storage array 26 to the video application programs executed by the host computer.

Figure 2:
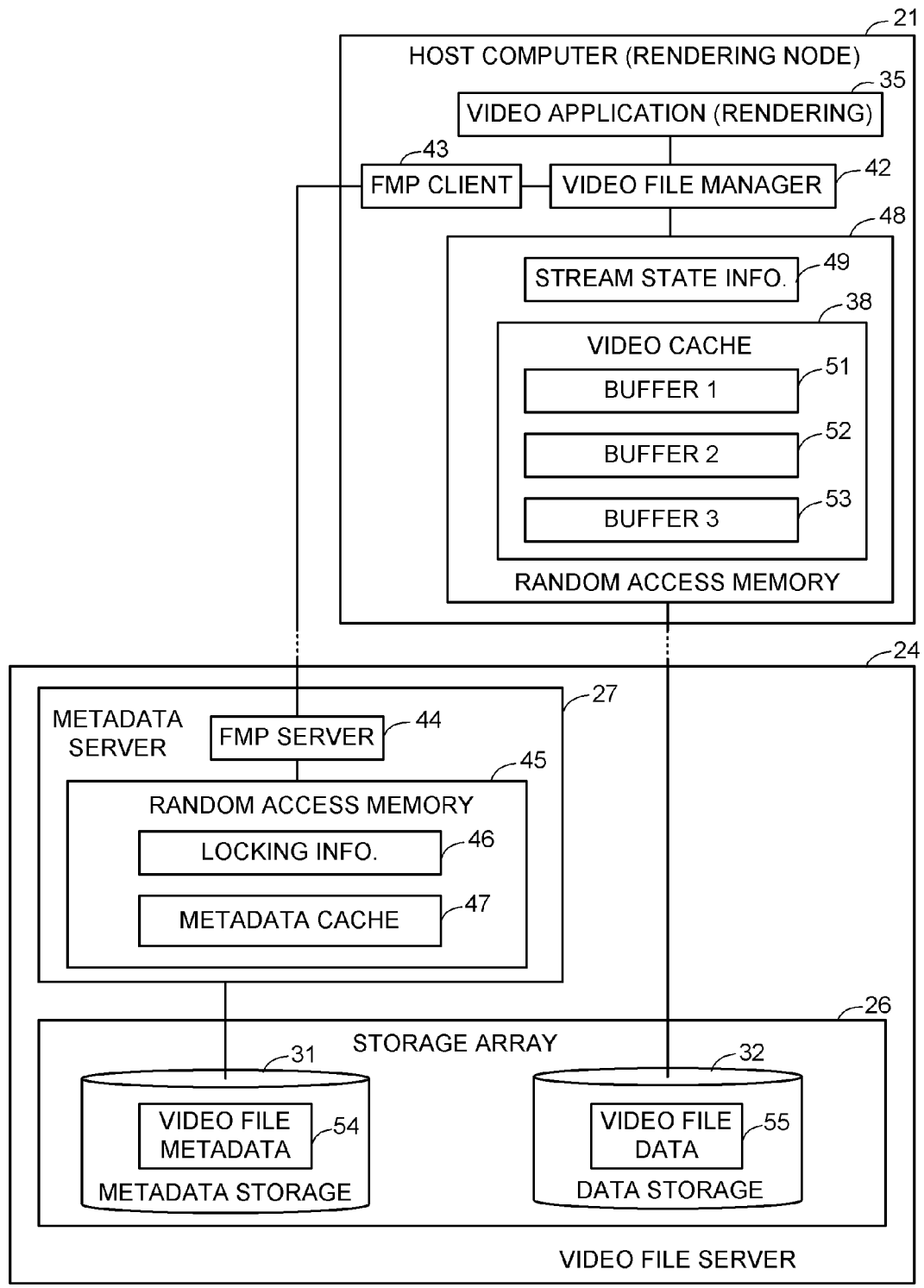
FIG. 2 is a block diagram of components in the video file server and in one of the host computers of FIG. 1 used for streaming video data from a video file in the video file server to the host computer.

FIG. 2 shows components from FIG. 1 used for streaming video data from a video file in the video file server 24 to the video application 35 in the host computer 21. The video file includes video file metadata 54 in the metadata storage 31 and video file data 55 in the data storage 32. For example, the shared file system in the storage array 26 is a UNIX-based file system, as described in Chapter 9, pp. 261-289 of Uresh Vahalia, Unix Internals: The New Frontiers, 1996, Prentice Hall, Inc., Simon & Schuster, Upper Valley River, N.J. 07458. In this case, the video file metadata 54 includes the inode and indirect blocks of the video file, and the video file data 55 includes the data blocks of the video file.

In practice, the video application 35 in the host computer 21 reads data from the video file by sending a request to read a specified file at a specified offset in the file. The request may also specify a size or number of bytes to be read beginning at the specified offset, or the number of bytes to be read may be predetermined for the particular type of request or the protocol of the request. Depending on the particular type of request or the protocol of the request, the file to be read may be specified in various ways, such as inode number, a LUN and target identifier, a file name, or a file handle previously obtained from a directory lookup.

The read request from the video application 35 is received by a video file manager 42 in the host computer 21. The video file manager 42 is an operating system program as further described below with reference to FIGS. 10-11. Upon receipt of a read request, the video file manager 42 accesses stream state information 49 in random access memory 48 of the host computer 21 to determine whether a stream has already been established between the video application 35 and the specified file. If a stream has not been established, then the video file manager 42 allocates three buffers 51, 52, and 53 in the random access memory 48 for handling the stream, and the video file manager 42 initiates respective processes for fetching some of the video file data 55 from the data storage 32 in the storage array 26 and filling the buffers 51, 52, 53 with the fetched video file data 55. At any given time, one of these buffer functions as a "forward" buffer, another of the buffers functions as a "middle" buffer, and the third buffer functions as a "backward" buffer, as further described below with reference to FIG. 5. In response to a read request from the video application 35 for data at a specified offset in the video file data 55, if a buffer is found to contain data of the specified file at the specified offset, then the requested data is returned from the buffer and at this time the buffer is the "middle" buffer for the stream.

The video file manager 42 could manage the video file metadata 54 as well as the video file data 55. However, as shown in FIG. 2, the task of managing the video file metadata 54 is performed by the metadata server 27. The metadata server 27 prevents conflicting host computer access to shared files in the storage array 26 and provides more uniform data access of the host computers to the shared files by serializing access of the host computers to the file data when the video streams are first established.

For example, once the buffers 51, 52, and 53 are allocated to establish a stream, the video file manager 42 invokes a file mapping protocol (FMP) client 43 of the host computer 21 to request file mapping information for fetching the video file data to fill the middle buffer. The FMP client 43 sends a "get map" request to a FMP server 44 in the metadata server 27. The FMP server 44 responds by checking whether locking information 46 in random access memory 45 of the metadata server 27 indicates a "write lock" on the video file. If there is not a write lock on the video file, then the FMP server 44 grants a "read lock" on the file to the host computer 21 by adding the host computer 21 to a "read lock" list for the video file in the locking information 46, and the FMP server looks up file mapping information for the video file in a metadata cache 47 in the random access memory 45 of the metadata server 27. If file mapping information for the video file is not found in the metadata cache 47, then the FMP server 44 fetches the file mapping information for the video file from the video file metadata 54 in the metadata storage 31 of the storage array 26. Then the FMP server 44 returns the file mapping metadata to the FMP client 43. For each data block to be fetched for the middle buffer 52, the file mapping metadata maps the data block to a corresponding logical block address where the block of video file data is stored in the data storage 32.

Figure 3:
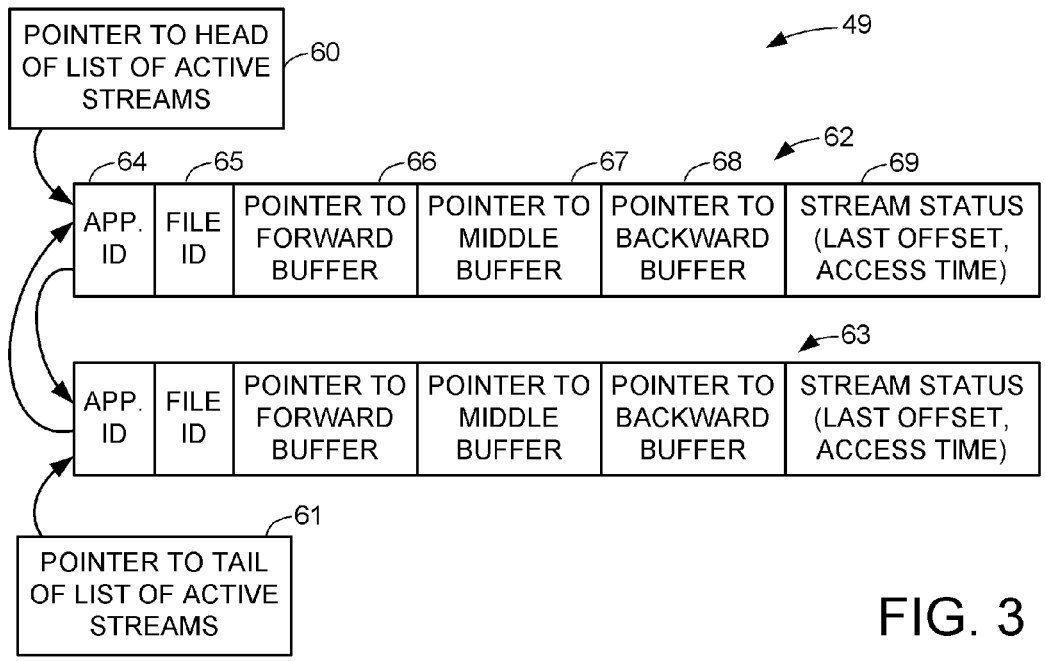
FIG. 3 is a block diagram of stream state information, which is stored in random access memory of the host computer in FIG. 2.

FIG. 3 shows the stream state information 49 introduced in FIG. 2. As shown in FIG. 3, the stream state information 49 is organized as a doubly-linked list of video streams that are active between the host computer and the storage array This linked list includes a pointer 60 to the head of the list, a pointer 61 to the tail of the list, and respective entries 62, 63 for streams that have been established between the host computer and the storage array. The entry 62, for example, includes an application identifier (APP. ID) 64, a file identifier (FILE ID) 65, a pointer 66 to a forward buffer of the stream, a pointer 67 to a middle buffer of the stream, a pointer 68 to a backward buffer of the stream, and stream status 69. The application identifier 64, for example, is a process identifier of the process of execution of the video application that requested video data from the video file identified by the file identifier 65. The file identifier 65, for example, is the inode number or file handle of the video file.

The stream status, for example, includes the offset of the last read access for the stream, and the time of the last read access for the stream. Whenever a read access occurs for a stream, the entry for the list is moved to the head of the list so that the entry for least recently accessed stream will be at the tail of the list. An entry for the stream is removed from the list when the video file is closed by the video application, or at the request of the metadata server so that another host computer may obtain a write lock on the file, or when more than a certain duration of time has elapsed since the last access time for the stream, or when the entry for the stream is at the tail of the list and buffers are needed to servicing a new stream having a higher priority.

Figure 4:
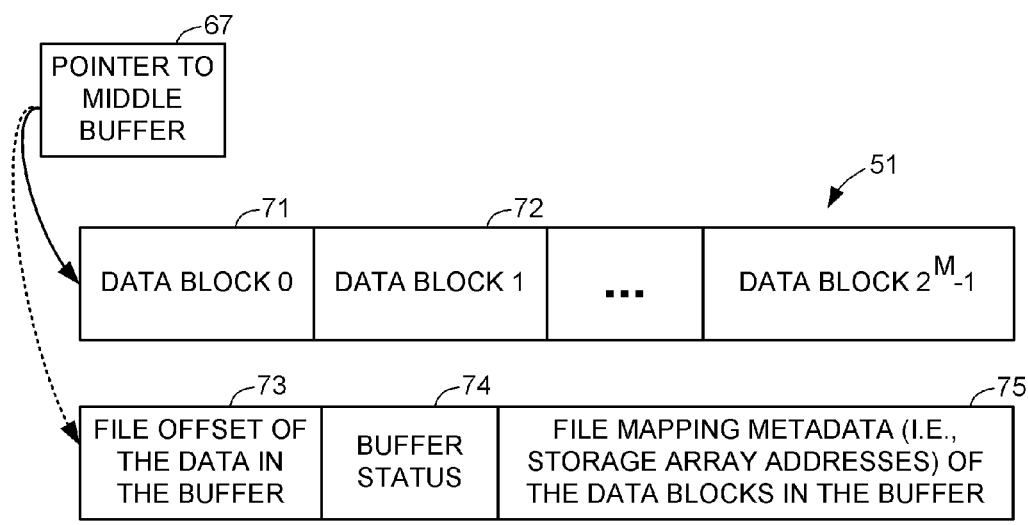
FIG. 4 is a block diagram of data structures associated with a buffer, which is stored in the random access memory of the host computer in FIG. 2.

FIG. 4 is a block diagram of data structures associated with the buffer 51 at a time when the buffer 51 is a middle buffer. At this time the pointer 67 to the middle buffer points to the buffer 51. The buffer 51 includes contiguous random access memory locations for storing multiple data blocks, for example 2*exp(M) data blocks 71, 72, etc. Each data block is the size of one file system data block, such as 8 kilobytes. Associated with the buffer 51 is metadata of the buffer including a file offset 73 of the first data block in the buffer, buffer status 74, and file mapping metadata 75 such as the storage array addresses of the data blocks in the buffer. The buffer status 74, for example, is a bit map indicating whether not each of the data blocks 71, 72, etc., is valid in the buffer 51.

Figure 5:
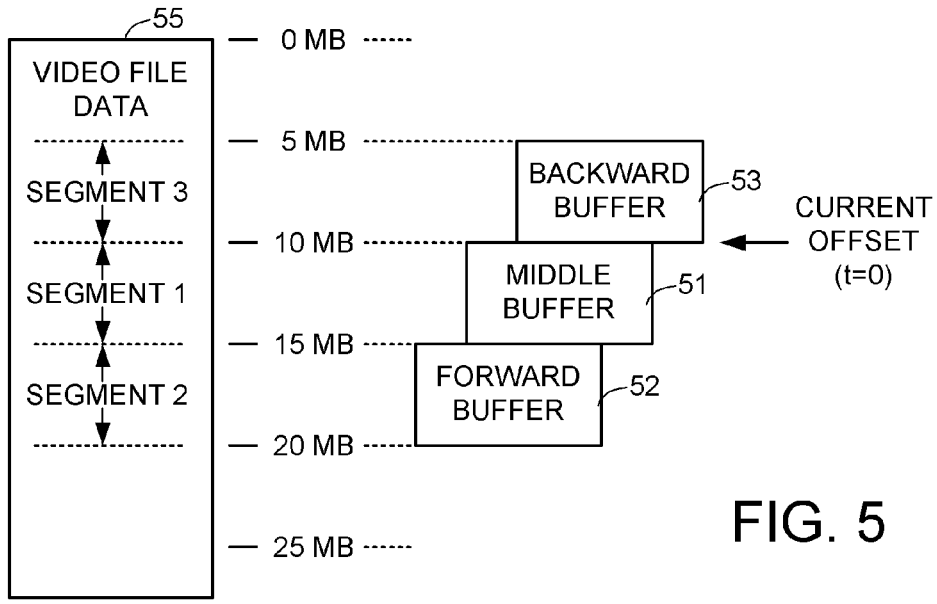
FIG. 5 is a schematic diagram showing relationships between the extent of a video file and a backward buffer, a middle buffer, and a forward buffer for streaming data from the video file.

FIG. 5 shows relationships between the extent of the video file 55 and respective contiguous segments of the video file data in the forward buffer 52, middle buffer 51, and backward buffer 53 when a stream has been established. The buffers are neighboring "windows" into the extent of the video file. For example, the buffer size is 5 megabytes, the I/O size is 100 kilobytes, and the stream has been established in response to an initial read request specifying an offset of 10 MB.

In FIG. 5, a first segment of data (SEGMENT 1) has been fetched from the video file data 55 and loaded into the first buffer 51. At this time the first buffer 51 is the middle buffer. This first segment begins at the current offset specified by the first read request upon the video file. Therefore, the first segment begins at an offset of 10 MB and ends just before an offset of 15 MB.

In FIG. 5, a second segment of data (SEGMENT 2) has been fetched from the video file data 55 and loaded into the second buffer 52. At this time the second buffer 52 is the forward buffer. The second segment of data is contiguous with and follows the first segment of data in the file. Consequently, the second segment of data, which is loaded in the forward buffer, begins just after the first segment of data in the middle buffer. In general, this second segment begins at an offset that is the sum of the window size and the current offset specified by the first read request upon the video file. Therefore, the second segment begins at an offset of 15 MB and ends just before an offset of 20 MB.

In FIG. 5, a third segment of data (SEGMENT 3) has been fetched from the video file data 55 and loaded into the third buffer 53. At this time the third buffer 53 is the backward buffer. The third segment of data is contiguous with and precedes the first segment of data in the file. Consequently, the third segment of data, which is loaded into the backward buffer, begins at the offset of 5 MB and ends just before the offset of 10 MB.

Except when the roles of the buffers are shifted or rotated based on stream state and triggered by the current offset crossing the boundaries of the middle buffer, the three buffers 51, 52, 53 are fully filled and ready to "follow" the current offset in such a way that regardless of the position of the current offset in the middle buffer and regardless of the playout direction, the middle buffer is surrounded by a forward buffer and a backward buffer so that the current offset can be served from the middle buffer and the service may continue without interruption into the forward buffer or the backward buffer.

Figure 6:
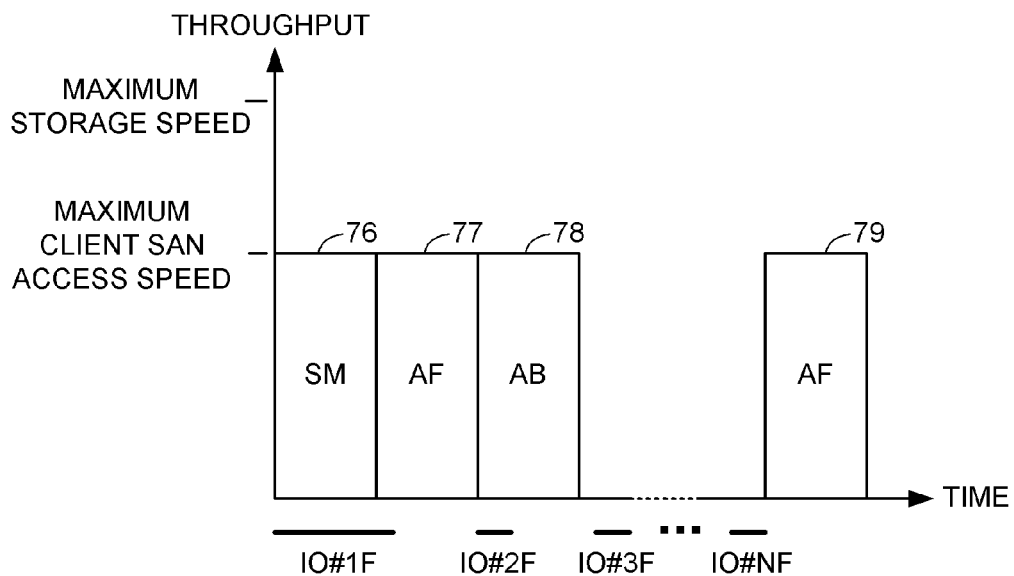
FIG. 6 is a graph of the throughput of the data storage array of FIG. 1 as a function of time when data is first fetched from the video file and loaded into the buffers of FIG. 5.

FIG. 6 is a graph of the throughput of the data storage array of FIG. 1 as a function of time when data is first fetched from the video file in the storage array and loaded into the buffers (51, 52, and 53 in FIG. 5). This occurs, for example, when the video application sends its first I/O request to the video file manager when the video application starts playing the video file. A similar throughput occurs when a video application begins to play from the video file after doing a "seek" operation, which creates a "gap" in the sequential play from the video file. At this time, the middle buffer is not filled with the data to be streamed to the video application, either at the beginning of play of the video file or after the "seek." The "real-time" phase of video streaming does not begin until the middle buffer becomes filled with the data to be streamed to the video application. Back-end latency in the storage array during the filling of the middle buffer is not a problem because the video application will not be displaying any video until streaming begins from the filled middle buffer.

In response to a first read request (IO#1F) from the host application, the video file manager first fetches video data for the middle buffer in a synchronous fashion (SM) from the storage array, so that data is not returned to the video application until the middle buffer has been filled. This results in a first interval 76 of throughput at a maximum client storage array network (SAN) access speed. In other words, the storage array delivers video data to the video cache of the host computer at a maximum possible rate. This maximum possible rate occurs when the throughput of the storage array to the video cache of the host computer is not diminished by the use of any shared storage array resources (such as storage array cache or a data bus or switch in the storage array) for concurrently servicing storage requests from other host computers.

The duration of processing for the first read request (IO#1F), as indicated by the length of the heavy line above "IO#1F" in FIG. 6, includes the duration of the first interval 76. The first read request (IO#1F) is completed shortly after the middle buffer is filled, because the first read request is completed by streaming data directly from the middle buffer to the video application once the middle buffer has been entirely filled.

Filling of the forward buffer in an asynchronous fashion (AF) begins immediately after the middle buffer is filled, resulting in a second interval 77 of throughput at the maximum client SAN access speed. Filling of the backward buffer in an asynchronous fashion (BF) begins immediately after the forward buffer is filled, resulting in a third interval 78 of throughput at the maximum client SAN access speed. These asynchronous forward (AF) and asynchronous backward (AB) operations pre-load the forward and backward buffers at the maximum speed and bandwidth available from the storage array using a storage access protocol, such as Fibre Channel (FC), SCSI, or internet SCSI (iSCSI). In this way, the backend storage is driven similar to a pulse-width modulation (PWM) signal pattern leaving the backend storage array idle most of the time ready to serve the other host computers in a similar fashion.

The worst conflict case is when all the video applications access the storage synchronously in which case the aggregate throughput of the storage array to the metadata server and all of the host computers will be bounded by the maximum throughput of the storage array used. Thus, the system should be designed to be able to feed a predetermined maximum number of host computers and video applications at an aggregate throughput lower or equal to the maximum storage speed throughput. For a rendering farm, the probability of all the video applications accessing the storage synchronously so as to exceed the maximum storage speed throughput is very low and is further reduced by use of the metadata server and the scheduling of the asynchronous pre-fetching and pre-loading as shown in FIG. 6.

The asynchronous filling of the forward buffer (AF) during the second interval 77 and the asynchronous filing of the backward buffer (BF) during the third interval 78 is unrelated to and independent of a second read request (IO#2F) and a third read request (IO#3F) from the host application in a continuous forward direction through the extent of the video file, because the second read request (IO#2F) and a third read request (IO#3F) are serviced quickly by transferring video data from the middle buffer to the host application.

After a certain number (N) of read requests from the host application in a continuous forward direction through the extent of the video file, the current offset will fall within the offset of the data in the forward buffer. At this time the pointers to the buffers are shifted or rotated in a backward direction, for example as further described below with reference to step 89 of FIG. 10, so that the backward buffer becomes a new forward buffer, the middle buffer becomes the backward buffer, and the old forward buffer becomes the middle buffer, and filling of the new forward buffer in an asynchronous fashion (AF) begins, resulting in a fourth interval 79 of throughput at the maximum client SAN access speed. The filling of the new forward buffer in an asynchronous fashion does not interfere with servicing of read requests from the host application in a continuous forward direction through the extent of the video file because these requests are serviced by streaming data from the middle buffer, which was the old forward buffer.

Once a first video stream is established by a video file manager filling the three buffers for the first stream at the maximum client SAN access speed, the same video file manager, or the video file manager of another host computer, may establish a second video stream concurrent with the first video stream by filling three buffers for the second stream at the maximum client SAN access speed during the idle time before or after the interval 79 of asynchronous filling of the forward buffer. Therefore, on the storage array side, instead of having many hosts non-optimally accessing the storage, creating I/O collisions and contention, the number of storage accesses are minimized to short pulses at the highest possible speed available for servicing each host computer, therefore leaving the storage array idle most of the time for other host computers to do the same. This behavior is similar to a Pulse Width Modulated (PWM) signal, where the duty cycle is dependent upon the width of the AF, AB and SM pulses in FIG. 6. Thus, efficiency is increased by the video file manager anticipating and responding to a relatively large number of I/O requests from a video application for relatively small extents of data for a video stream by producing a minimal number of storage access requests for larger extents of data for the video stream. This is done in such a way that the streaming of the minimal number of larger extents of data from the storage array causes minimal conflict with the streaming of video data from the storage array for concurrent video streams.

If all the host computers are accessing the storage array using the same patterns, then the storage array should always be either working full speed or be idle waiting for asynchronous work items to be fulfilled. Because the access is asynchronous, the width of the pulse is defined by the size of the buffer and the speed of access, while the period of the PWM pulse is defined by the storage latency that needs to be overcome by the video caches. The window size can be computed using the HD stream bit rate and maximum storage latency to be hidden, according to the formula:

$$WindowSize = StreamBitrate \times MaxLatency \quad (1)$$

The WindowSize can be either a parameter of the host video application or calculated for each bit rate and storage array automatically. Different host video applications, such as video editing stations, can have different speeds of access and play different HD streams at different bitrates so the WindowSize of different host video applications can be different from client to client but the behavior of the access can be identical. The host video application or the video file manager could measure the latency and adapt the WindowSize parameter automatically. This mechanism allows maximizing the storage access throughput.

The access pattern from the video file manager to the storage will actually be a series of maximum bandwidth (client maximum SAN access speed) pulses that can easily be compared to a PWM signal pattern that will leave the storage array idle as much as possible between the pulses limited by the maximum client SAN access speed. The width of the pulse, duty cycle of the PWM signal, can be computed as follow:

$$\text{Width} = \text{WindowSize}/\text{MaxSpeed} \quad (2)$$

where MaxSpeed is the maximum client SAN access speed (e.g., the throughput of the host bus adapter (HBA) of the host computer of the SAN shared with the storage array and the other host computers), and the Width is measured in seconds. The maximum client SAN access speed need not be the same for each host computer, and it could be measured by each video file manager according to the pipes or connection technologies used between each video cache and the storage array.

In a similar manner the idle time between the pulses, and the period of the PWM signal, can be computed using:

$$\text{Period} = \text{WindowSize}/\text{StreamBitrate} \quad (3)$$

Therefore, the whole PWM ratio (duty cycle "on" versus "off") can be computed by the ratio Width/Period, and therefore comes down to the easy to understand ration of $$\text{PWM} = \text{StreamBitrate}/\text{MaxSpeed} \quad (4)$$

All the above equations assume that the MaxSpeed of each client is higher than the video StreamBitrate; otherwise, the loading of the asynchronous windows will take longer than it takes to play-out the video data in the middle buffer of the video cache of the host computer, resulting in dropped frames. For example in the case of a host computer using an 8 Gbit (1 GB/sec) FC connection to the shared SAN and uncompressed HD video bit rate of 165 MB/sec, the duty cycle of the PWM can be calculated by:

$$\text{PWM} = 165/1000 = 0.165 \quad (5)$$

In a similar manner, assuming a storage access latency of 0.5 seconds, the WindowSize is calculated from (1) as:

$$\text{WindowSize} = 165 \times 0.5 = 82.5 \text{ MB} \quad (6)$$

and the Period of the PWM waveform can be calculated, using equation (3) as:

$$\text{Period} = 82.5/165 = 0.5 \text{ sec} \quad (7)$$

Therefore the period of the PWM is equal to the maximum latency of the storage array except if the WindowSize is limited by the video cache size of the host computer divided by 3, in this case to recover from latencies of 0.5 sec, then there should be at least 247.5 MB of free memory in the video cache of the host computer.

So, the "off" time in this example is computed as:

$$T\text{off} = (1 - 0.165) \times 0.5 = 0.42 \text{ sec} \quad (8)$$

This confirms that the total bandwidth usage of the storage array in the end does not depend on the buffering strategy but rather on the amount of video needed by the video application, which makes sense. However, by using the storage array in an optimal manner, one can make the point that the effective maximum bandwidth of the array is increased by doing so, therefore for a given video application, decreasing the PWM ratio (duty cycle) and by this allowing more HD streams to be played at the same time, which is another advantage of the buffering strategy of FIG. 6.

Figure 7:
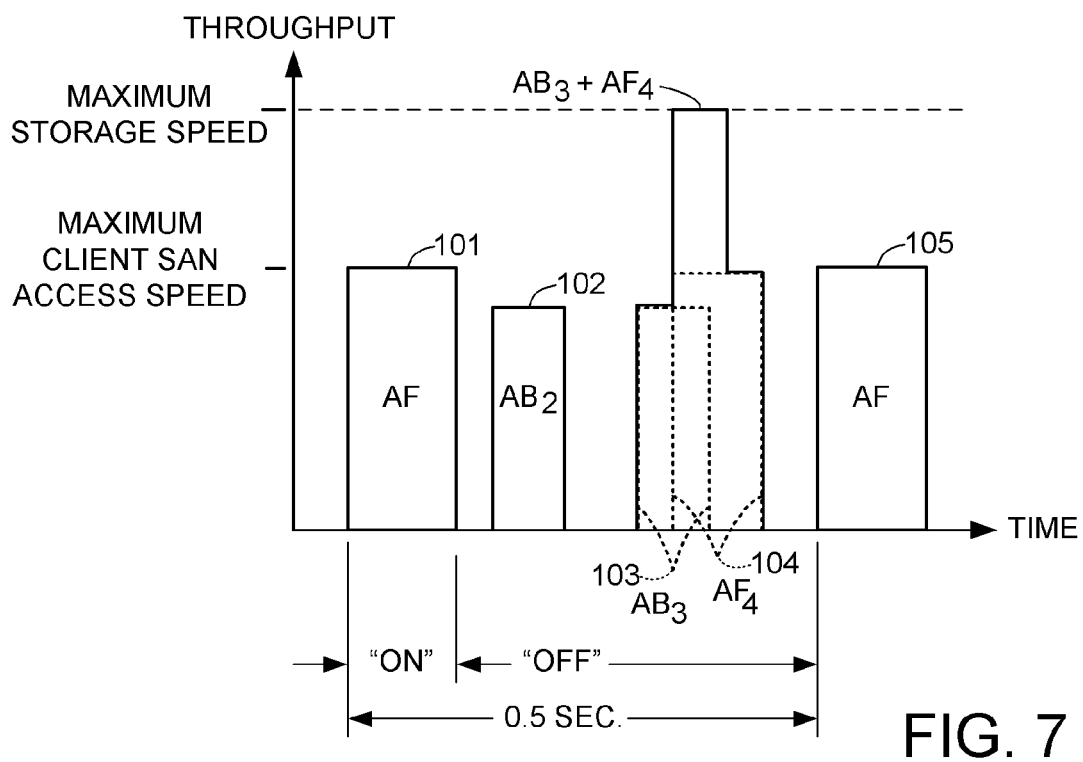
FIG. 7 is a graph of the throughput of the data storage array of FIG. 1 when there are multiple concurrent streams of video data from the data storage array to the host computers.

FIG. 7 shows the diagram of the PWM waveform for this example during steady state forward playout of an HD stream. In this case the only buffers that are loaded from the storage array for the HD stream are forward buffers, which are loaded during the intervals 101 and 105 shown in FIG. 7. As FIG. 7 indicates, data for other video applications are loaded from the storage array during the otherwise idle time between the intervals 101 and 105 in order to minimizing the aggregate load upon the storage array. In particular, FIG. 7 shows that between the intervals 101 and 105, the storage array is accessed at different bit rates at or less than the maximum client SAN access speed for other video applications. For example, a forward buffer is loaded during an interval 102 for a second video application, another forward buffer is loaded during an interval 103 for a third video application, and another forward buffer is loaded during an interval 104 for a fourth video application.

FIG. 7 shows that the storage array is accessed concurrently for the third and fourth video applications (because the intervals 103 and 104 overlap) and as a result their aggregate throughput is bounded by the maximum installed throughput of the storage array. The result is that it takes longer to load the forward buffers for the third and fourth video applications than it would take for each forward buffer individually due to the limitation of the aggregate throughput. Since there are no additional storage access requests concurrent with the intervals 103 and 104, the delay due to the concurrent access and the limitation of the aggregate throughput is sufficiently small that the forward buffers for the third and fourth applications nevertheless are fully loaded in time for continuous forward streaming to the third and fourth video applications before any frames are dropped.

In addition the duty cycle of the PWM waveform (e.g., the duration of the pulse 101 divided by the pulse repetition period of 0.5 sec.) depends on the bit rate of the video stream (AF) as well as the maximum client SAN access speed (e.g., the speed of the FC access pipe carrying the video stream AF), and this duty cycle can be varied by changes in either of these variables. This makes the PWM behavior adaptive to these changes and result in the modulation of the PWM waveform.

Figure 8:
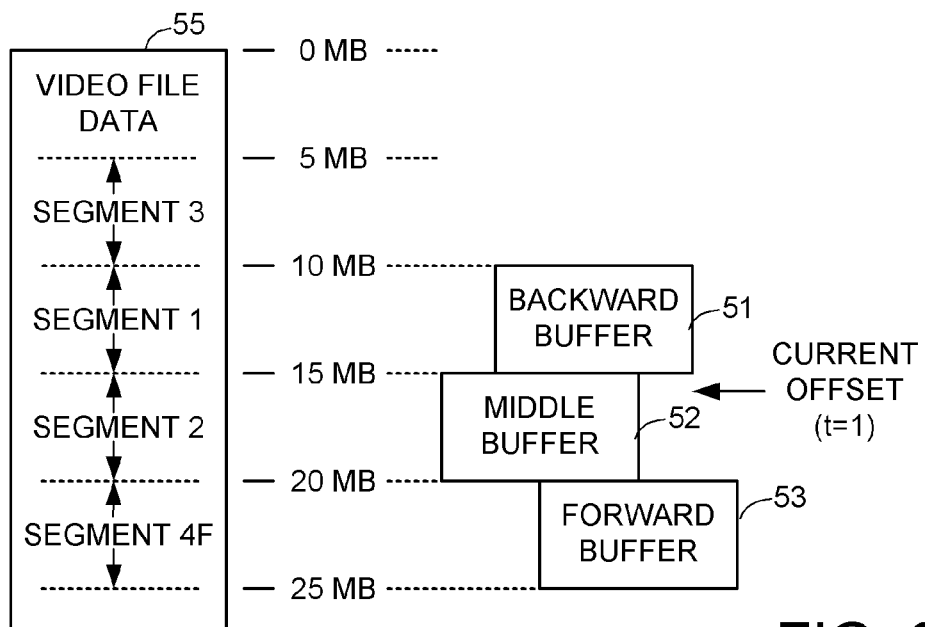
FIG. 8 is a schematic diagram showing the relationships between the extent of the video file and the backward buffer, middle buffer, and forward buffer when a current offset has advanced forward in the extent of the file from an initial position shown in FIG. 5.

FIG. 8 shows the relationships between the extent of the video file and the backward buffer, middle buffer, and forward buffer when the current offset has advanced forward in the extent of the file from an initial position shown in FIG. 5. This is the state of the buffers at the end of the interval (78 in FIG. 6) of asynchronous filling of the new forward buffer 53 in FIG. 8. The buffer 51, which was the middle buffer in FIG. 5, has become the backward buffer in FIG. 8, and the buffer 52, which was the forward buffer in FIG. 5, has become the middle buffer. The current offset falls within the offset range of the data in the middle buffer 52. The buffer 53, which was the backward buffer in FIG. 5, has become the new forward buffer 53 in FIG. 8. The third segment, which previously was in the buffer 53, has been replaced with a fourth segment (SEGMENT 4F) of data, which has been fetched from the video file data 55 and loaded into the buffer 53.

As further shown in FIG. 8, the current offset has advanced to about 16 megabytes in the video file 55. At this time, the data in the backward buffer 51 starts at an offset of 10 megabytes in the video file 55, and the data in the backward buffer ends just before an offset of 15 megabytes in the video file 55. The data in the middle buffer 52 starts at the offset of 15 megabytes in the video file 55, and ends just before an offset of 20 megabytes in the video file 55. The data in the forward buffer 53 starts at an offset of 20 megabytes in the video file 55, and ends just before an offset of 25 megabytes in the video file 55.

The backward buffer prevents the interruption of continuous video playout in a backward direction when the current offset crosses the lower offset boundary of the middle buffer. The video application obtains continuous video playout in the backward direction from the video file manager by sending a series of I/O read requests to the video file manager, in which the specified offset in each successive I/O request is decreased by the I/O size. For example, starting from an initial offset of 10 megabytes and for an I/O size of 100 kilobytes, the offset of a first I/O read request is 10 megabytes, the offset of a second I/O read request is 9.9 kilobytes, the offset of a third I/O offset is 9.8 kilobytes, etc. In response to each such I/O read request, the video file manager returns a stream of 100 kilobytes of video in the forward direction from the specified offset to the specified offset plus 100 kilobytes minus 1. Thus, the video application simulates a continuous backward read of the file by "seeking" backward after each I/O read request. This would cause a conventional "read-ahead" pre-fetch to fail, because in response to an I/O read request, a conventional "read-ahead" pre-fetch would return data from the storage array that is not used by the video application seeking backward after each I/O read request, and a cache miss would occur for each subsequent I/O read request in the series. By keeping a backward buffer as well as a forward buffer on opposite sides of the middle buffer, a similar buffering scheme can be used for buffering both backward and forward video streams.

Figure 9:
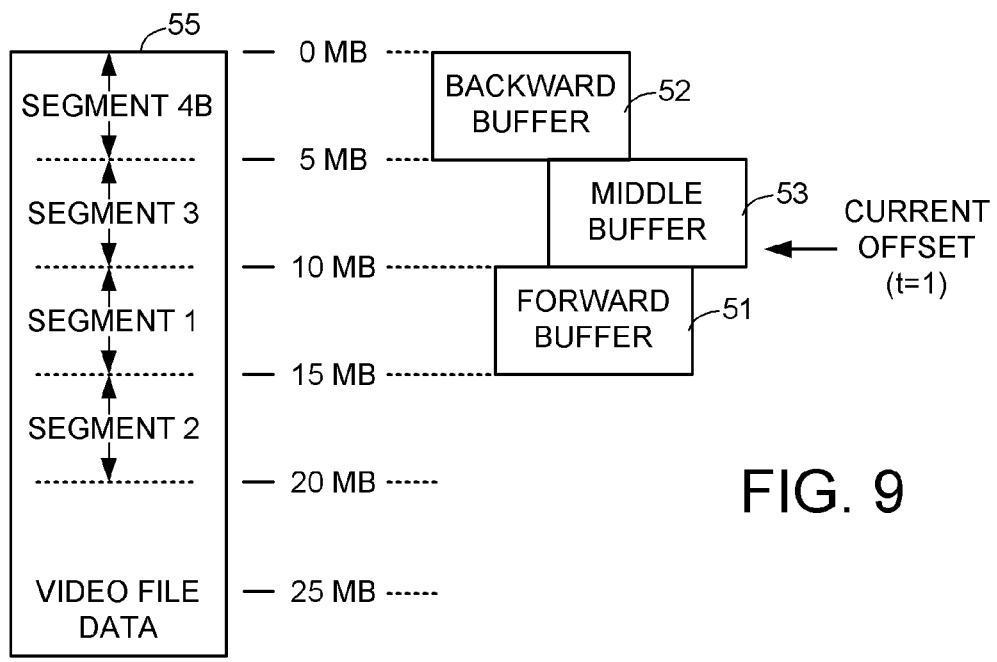
FIG. 9 is a schematic diagram showing the relationships between the extent of the video file and the backward buffer, middle buffer, and forward buffer when a current offset has advanced backward in the extent of the file from an initial position shown in FIG. 5.

FIG. 9 shows the relationships between the extent of the video file and the backward buffer, middle buffer, and forward buffer when the current offset has advancing backward in the extent of the file from the initial position shown in FIG. 5 and has crossed the lower extent boundary of the middle buffer 51 in FIG. 5. The crossing of the lower extent boundary of the middle buffer 51 in FIG. 5 causes the video file manager to change the role of the buffer 51 from a middle buffer 51 in FIG. 5 into a forward buffer 51 in FIG. 9. The backward buffer 53 in FIG. 5 has become the middle buffer 53 in FIG. 9. The forward buffer 52 in FIG. 5 has become a new backward buffer 52 in FIG. 9, and the video file manager has filled the new backward buffer with a fourth segment (SEGMENT 4B) of data pre-fetched from the storage array in an asynchronous process. Therefore the second segment of data, which was previously in the buffer 52, has been replaced with the fourth segment of data.

For example, as shown in FIG. 9, the current offset has moved backward to about 9 megabytes in the video file 55. At this time, the data in the backward buffer 52 starts at an offset of 0 megabytes in the video file 55, and the data in the backward buffer ends just before an offset of 5 megabytes in the video file 55. The data in the middle buffer 53 starts at the offset of 5 megabytes in the video file 55, and ends just before an offset of 10 megabytes in the video file 55. The data in the forward buffer 51 starts at an offset of 10 megabytes in the video file 55, and ends just before an offset of 15 megabytes in the video file 55.

In addition to streaming video data continuously from the middle buffer for forward or backward sequential access, the video file manager may switch between pre-fetching for forward or backward sequential access upon crossing the boundaries of the middle buffer. Moreover, the video file manager may detect that the current offset is also outside the offset range of the forward and backward buffers, and in this case the video file manager discontinues pre-fetching until the gap between the offsets of successive I/O requests upon the file from the video application becomes sufficiently small to indicate that the video application has resumed forward or backward sequential access upon the file.

For example, a significant gap between the offsets of successive I/O requests upon a video file typically occurs when a HD video streaming application is either fast forwarding or is in a seeking mode to a new offset at which forward or backward sequential access will begin. During the fast forwarding or the seeking mode, the real time requirements are not as restrictive as for forward or backward sequential access because the fast forwarding or seeking mode already has altered the "time line" of the video delivered to the application so that some further alteration due to possible "dropped frames" is tolerable. Although pre-fetching during the fast forwarding or seeking mode might eliminate some of these possible "dropped frames," any pre-fetching during the fast forwarding or seeking mode is likely to result in a cache trashing situation in which data is pre-fetched from the storage array and loaded into the video cache of the host computer but not used by the video application. Therefore, any reduction in "dropped frames" from pre-fetching during the fast forwarding or seeking mode for a HD video application is not worth the consumption of storage array resources from the cache trashing, which may result in less tolerable dropped frames to other video applications.

When the pre-fetching is disabled, the video file manager fetches from the video file and returns to the video application only the video data that was actually requested by the video application. As soon as the video file manager detects that the gap between the offsets of two successive I/O requests of the video application upon the file is less than a certain threshold indicating sequential access, the video file manager initiates pre-fetching and loading of the middle buffer, the forward buffer, and the backward buffer in a fashion similar to the initial pre-fetching and loading after the buffers for the stream were first allocated.

Figure 10:
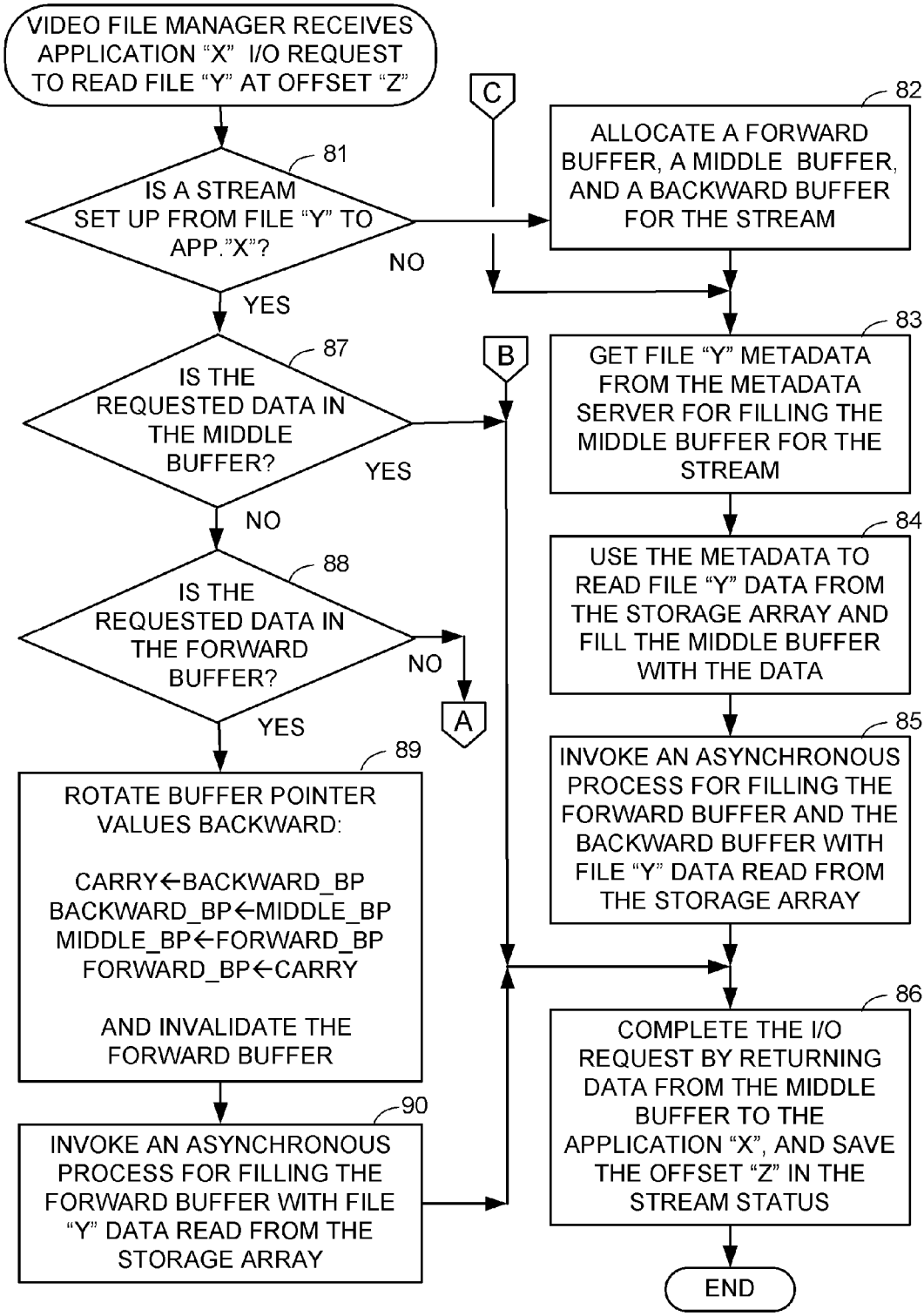
FIGS. 10 and 11 together comprise a flowchart of a procedure executed by a video file manager of FIG. 2 for responding to a request from a host computer application for reading a specified video file at a specified offset in the extent of the file.
Figure 11:
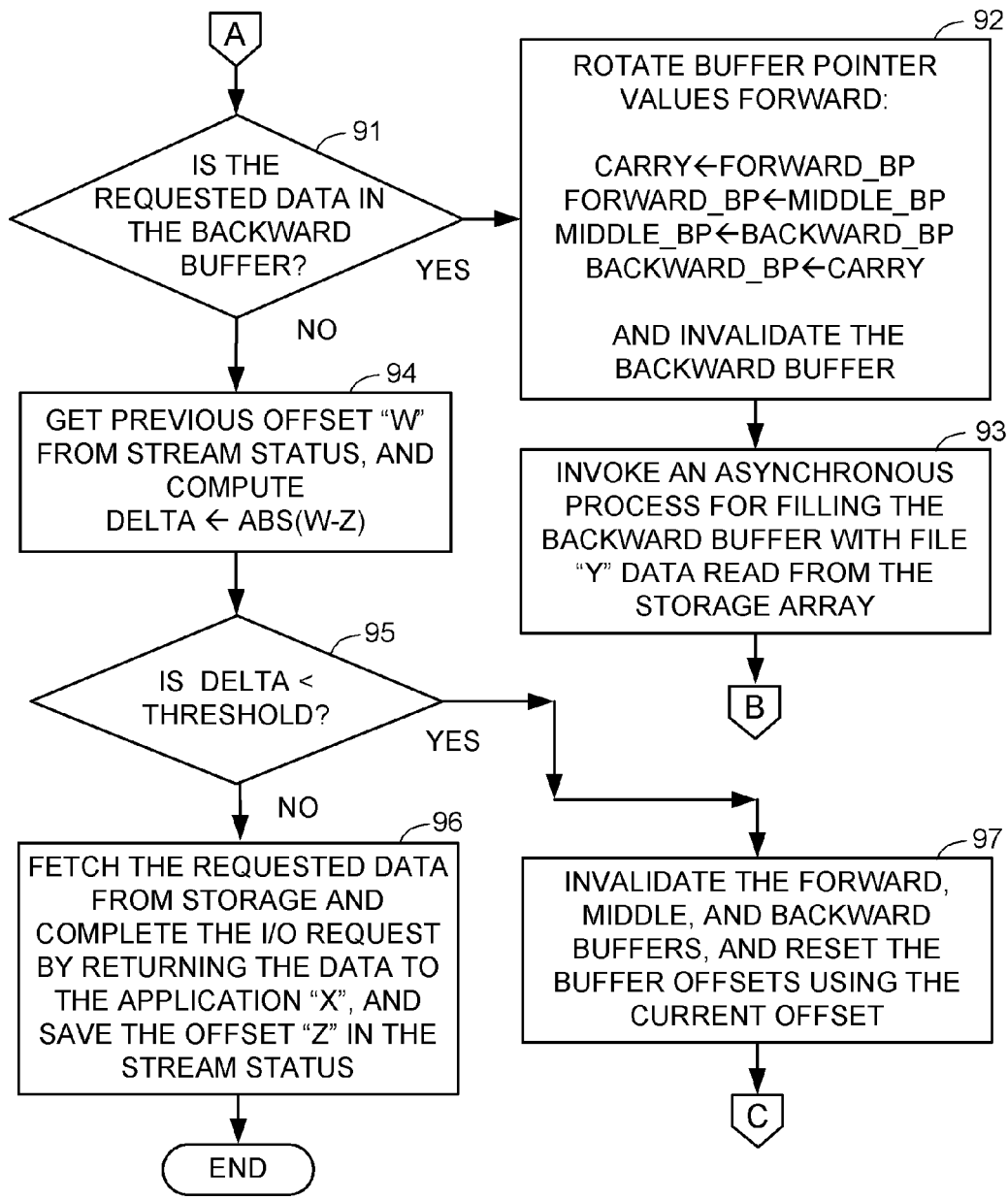

FIGS. 10 and 11 show a procedure executed by the video file manager of FIG. 2 for responding to a request from a host computer application ("X") for reading a specified video file ("Y") at a specified offset ("Z") in the extent of the file. In a first step 81, the video file manager accesses the stream state information (49 in FIG. 2) to determine whether or not a stream has already been set up from the specified file ("Y") to the application ("X"). For example, the stream state information is in the form of a list of active streams as shown in FIG. 3, and this list of active streams is searched for an entry having an application identifier for the application ("X"), and a file identifier for the specified file ("Y").

If a stream has not already been set up from the specified file ("Y") to the application ("X"), then execution branches from step 81 to step 82. In step 82, the video file manager allocates a forward buffer, a middle buffer, and a backward buffer for the stream. For example, this is done by obtaining buffer pointers from a list or map of free buffers, setting the buffers to an initial invalid state by clearing the status (74 in FIG. 4) of each buffer, setting the file offset (73 in FIG. 4) of each buffer to a value for the specified offset ("Z") and also dependent upon the window size for the case of the forward and backward buffers, and adding an entry for the stream to the list of active streams (FIG. 3). Next, in step 83, the video file manager gets the file mapping metadata (75 in FIG. 4) of the specified file from the metadata server for filling the middle buffer for the stream. Then, in step 84, the video file manager uses the file mapping metadata to read the file data from the storage array and fill the middle buffer with the data. Then, in step 85, the video file manager invokes an asynchronous process for filling the forward buffer and the backward buffer with data of the specified file from the storage array. For example, the asynchronous process obtains the file mapping metadata for filling the forward buffer from the metadata server, and then fetches the data from the storage array and fills the forward buffer with the data fetched from the storage array. Then the asynchronous process obtains the file mapping metadata for filling the backward buffer from the metadata server, and then fetches the data from the storage array and fills the backward buffer with the data fetched from the storage array. Because the process is asynchronous, execution continues from step 85 to step 86 as soon as the asynchronous process is initiated or scheduled for execution. The asynchronous process is invoked in step 85 very quickly in comparison to the time for filling the middle buffer.

In step 86, the read request is completed by returning data from the middle buffer to the application, and then the procedure of FIG. 10 is finished. Performance of the asynchronous process invoked in step 85 occurs concurrently with step 86 of returning data from the middle buffer to the application, and the asynchronous process invoked in step 85 may continue for some time after step 86 is completed.

In step 81, if a stream has already been set up from the specified file to the video application, then execution continues to step 87. In step 87, the video file manager determines whether the requested data is in the forward buffer. For example, the video file manager compares the specified offset "Z" from the read request to the beginning offset (73 in FIG. 4) of the middle buffer and to the ending offset of the middle buffer to determine whether or not the offset "Z" falls within the offset range of the middle buffer. (The ending offset of the middle buffer is computed from the beginning offset of the middle buffer and the middle buffer size.) If the requested data is in the middle buffer, then execution branches from step 87 to step 86, to complete the read request by returning data from the middle buffer to the application, and the procedure of FIGS. 10-11 is finished.

In step 87, if the requested data is not in the middle buffer, then execution continues from step 87 to step 88. In step 88, the video file manager determines whether the requested data is in the forward buffer. For example, the video file manager compares the specified offset "Z" from the read request to the beginning offset of the forward buffer and to the ending offset of the forward buffer to determine whether or not the offset "Z" falls within the offset range of the forward buffer. (The ending offset of the forward buffer is computed from the beginning offset of the forward buffer and the buffer size.) If the requested data is in the forward buffer, then execution continues from step 88 to step 89.

In step 89, the values of the buffer pointers for the stream are rotated backward by moving the value of the middle buffer pointer to the backward buffer pointer, moving the value of the forward buffer pointer to the middle buffer pointer, and moving the value of the backward buffer pointer to the forward buffer, and then the forward buffer is invalidated. For example, the buffer pointer values are rotated backward by execution of the following sequence of operations:
    Carry←Backward_Buffer_Pointer
    Backward_Buffer_Pointer←Middle_Buffer_Pointer
    Middle_Buffer_Pointer←Forward_Buffer_Pointer
    Forward_Buffer_Pointer←Carry Execution continues from step 89 to step 90. In step 90, the video file manager invokes an asynchronous process for filling the forward buffer with data of the specified file read from the storage array. For example, the asynchronous process obtains the file mapping metadata for filling the forward buffer from the metadata server, and then fetches the data from the storage array and fills the forward buffer with the data fetched from the storage array. The execution continues to step 86 to complete the read request by returning data from the middle buffer to the application. Because the process invoked in step 90 is asynchronous, execution continues from step 90 to step 86 as soon as the asynchronous process is initiated or scheduled for execution. The asynchronous process is invoked in step 85 very quickly in comparison to the time for competing read request in step 86. Performance of the asynchronous process invoked in step 90 occurs concurrently with step 86 of returning data from the middle buffer to the application, and the asynchronous process invoked in step 90 may continue for some time after step 86 is completed.

In step 88, if the video file manager determines that the requested data is not in the forward buffer, then execution continues to step 91 in FIG. 11. In step 91, the video file manager determines whether the requested data is in the backward buffer. For example, the video file manager compares the specified offset "Z" from the read request to the beginning offset of the backward buffer and to the ending offset of the backward buffer to determine whether or not the offset "Z" falls within the offset range of the backward buffer. (The ending offset of the backward buffer is computed from the beginning offset of the backward buffer and the buffer size.) If the requested data is in the backward buffer, then execution continues from step 91 to step 92.

In step 92, the buffer pointer values for the stream are rotated forward by moving the value of the middle buffer to the forward buffer pointer, moving the value of the backward buffer pointer to the middle buffer pointer, and moving the value of the forward buffer pointer to the backward buffer pointer, and then the backward buffer is invalidated. For example, the buffer pointer values are rotated forward by execution of the following sequence of operations:
    Carry←Forward_Buffer_Pointer
    Forward_Buffer_Pointer←Middle_Buffer_Pointer
    Middle_Buffer_Pointer←Backward_Buffer_Pointer
    Backward_Buffer_Pointer←Carry Execution continues from step 92 to step 93. In step 93, the video file manager invokes an asynchronous process for filling the backward buffer with data of the specified file read from the storage array. For example, the asynchronous process obtains the file mapping metadata for filling the backward buffer from the metadata server, and then fetches the data from the storage array and fills the backward buffer with the data fetched from the storage array. The execution continues to step 86 to complete the read request by returning data from the middle buffer to the application. Because the process invoked in step 93 is asynchronous, execution continues from step 93 to step 86 as soon as the asynchronous process is initiated or scheduled for execution. The asynchronous process is invoked in step 93 very quickly in comparison to the time for competing read request in step 86. Performance of the asynchronous process invoked in step 93 occurs concurrently with step 86 of returning data from the middle buffer to the application, and the asynchronous process invoked in step 93 may continue for some time after step 86 is completed.

In step 91, if the requested data is not in the backward buffer, then execution continues from step 91 to step 94. In this case, the requested data is not in any of the forward, middle, or backward buffers, so that the requested data must be fetched from the storage array, either with or without pre-fetching. The video application might be doing a fast forward or seek, in which case the requested data should be fetched from the storage array without pre-fetching. The video application might be restarting a sequential reading of the video data forward or backward, in which case the requested data should be fetched from the storage array with a restart of pre-fetching for continuous streaming of the video data.

In step 94, to determine whether or not the video application is likely to be restarting a sequential reading of the video data forward or backward, the video file manager gets the previous offset "W" from the stream status (69 in FIG. 4), and computes an offset distance (DELTA) as the absolute value ABS(W−Z) of the difference between the previous offset "W" and the current offset "Z". Then, in step 95, execution continues to step 96 if the offset distance (DELTA) is not less than a certain threshold. The certain threshold, for example, is less than one-half of the window size, and the certain threshold is at least the I/O size of the read requests of the video application. In this case, the video application is likely to be in a fast forward or seek mode rather than a continuous streaming mode. Therefore, in step 96, the video file manager fetches the requested data from storage and completes the I/O request by returning the data to the application, and saves the offset "X" in the stream status, and the procedure of FIGS. 10-11 is finished.

In step 95, execution branches to step 97 if the offset distance (DELTA) is less than the certain threshold. In this case, it is likely that the video application is in continuous streaming mode, so that pre-fetching should be restarted beginning at the current offset. Therefore, in step 97, the forward, middle, and backward buffers are invalidated, and the respective offsets of the forward, middle, and backward buffers are reset using the current offset as described above with respect to step 82 of FIG. 10. Execution continues from step 97 to step 83 to restart pre-fetching beginning at the current offset.

In view of the above, there has been described a video stream caching mechanism that hides storage and network latencies regardless of the direction of playback (forward or backward) and regardless of gaps between streams of sequential access. Three contiguous segments of video data are kept in video cache memory for streaming the video data to a host application from a video file in data storage. For example, three buffers are allocated in the cache memory for each video stream from a file to a host application, and at any given time during sequential access, a particular one of the three buffers is a middle buffer from which pre-fetched data is streamed to the host application. For forward or backward streaming, the buffers also include a backward buffer as well as a forward buffer on opposite sides of the middle buffer. In order to simplify the assembling of the buffers, a shift or rotation of the roles of the buffers and an asynchronous pre-fetch for continuance of a stream or for a switched direction of a stream is triggered by the cache state of the offset requested by the video application. This shift or rotation of the roles of the buffers also allows for pseudo-random access patterns and gaps between sequential access as well as switching of direction of sequential access.

What is claimed is:

1. A computer-implemented method of operating a cache memory for forward playback and backward playback of video data to a host application from a video file in a storage array, the method comprising:

fetching a first segment of data from the video file in the storage array and storing the first segment of data in the cache memory;

fetching a second segment of data from the video file in the storage array and storing the second segment of data in the cache memory, the second segment of data being contiguous with and following the first segment of data in the video file;

fetching a third segment of data from the video file in the storage array and storing the third segment of data in the cache memory, the third segment of data being contiguous with and preceding the first segment of data in the video file;

after the fetching of the first, second, and third segments of data from the video file in the storage array and the storing of the first, second, and third segments of data in the cache memory, receiving from the host application a request for data from the video file beginning at a specified offset in the video file, and responding to the request for data by searching the cache memory for data from the video file at the specified offset in the video file and finding that the data from the video file at the specified offset is in the third segment of data in the cache memory, and in response to finding that the data from the video file at the specified offset is in the third segment of data in the cache memory, returning data from the third segment of data in the cache memory to the host application and fetching a fourth segment of data from the video file in the storage array and storing the fourth segment of data from the video file in the cache memory, the fourth segment of data being contiguous with and preceding the third segment of data in the video file;

which includes performing a search of cache state information in response to an initial sequence of first and second read requests from the host application for reading data from the video file, and performing the fetching of the first, second, and third segments of data from the video file in the storage array in response to the search of the cache state information finding that the cache state information indicates that: (a) buffers have already been allocated in the cache memory for buffering the first, second, and third segments of the data from the video file, and (b) the buffers do not include the data requested by the second read request, and (c) the initial sequence of the first and second read requests is likely to be the beginning of a sequential access of the video file; and wherein further computing a distance between an offset specified by the first read request and an offset specified by the second read request and comparing the distance to a threshold and finding that the comparison indicates that the initial sequence of the first and second read requests is likely to be the beginning of a sequential access of the video file.

2. A computer-implemented method of operating a cache memory for forward playback and backward playback of video data to a host application from a video file in a storage array, the method comprising:

fetching a first segment of data from the video file in the storage array and storing the first segment of data in the cache memory;

fetching a second segment of data from the video file in the storage array and storing the second segment of data in the cache memory, the second segment of data being contiguous with and following the first segment of data in the video file;

fetching a third segment of data from the video file in the storage array and storing the third segment of data in the cache memory, the third segment of data being contiguous with and preceding the first segment of data in the video file; and after the fetching of the first, second, and third segments of data from the video file in the storage array and the storing of the first, second, and third segments of data in the cache memory, receiving from the host application a request for data from the video file beginning at a specified offset in the video file, and responding to the request for data by searching the cache memory for data from the video file at the specified offset in the video file and finding that the data from the video file at the specified offset is in the third segment of data in the cache memory, and in response to finding that the data from the video file at the specified offset is in the third segment of data in the cache memory, returning data from the third segment of data in the cache memory to the host application and fetching a fourth segment of data from the video file in the storage array and storing the fourth segment of data from the video file in the cache memory, the fourth segment of data being contiguous with and preceding the third segment of data in the video file;

wherein the fetching of the first segment of data from the video file in the storage array is performed during a first fetching process in response to an initial read request from the host application for data from the video file, and returns data requested by the initial read request to the host application after the first segment of data in the cache memory has been loaded into the cache memory; and after the first fetching process, further in response to the initial read request from the host computer for data from the video file, performing the fetching of the second segment of data from the video file in the storage array and storing the second segment of data in the cache memory during a second fetching process that is asynchronous with the return of data requested by the initial read request to the host application, and thereafter, further in response to the initial read request from the host application for data from the video file in the storage array, performing the fetching of the third segment of data from the video file in the storage array and storing the third segment of data in the cache memory during a third fetching process that is asynchronous with the return of data requested by the initial read request to the host application; and wherein further computing a distance between an offset specified by the first read request and an offset specified by the second read request and comparing the distance to a threshold and finding that the comparison indicates that the initial sequence of the first and second read requests is likely to be the beginning of a sequential access of the video file.

3. In a data processing system including a host computer and a storage array coupled to the host computer for servicing storage access requests from the host computer, the host computer having a cache memory and being programmed with a video application and a video file manager, a computer-implemented method of operating the host computer for forward playback and backward playback of video data to the video application from a video file in the storage array, the method comprising:

the video file manager fetching a first segment of data from the video file in the storage array and storing the first segment of data in the cache memory;

the video file manager fetching a second segment of data from the video file in the storage array and storing the second segment of data in the cache memory, the second segment of data being contiguous with and following the first segment of data in the video file;

the video file manager fetching a third segment of data from the video file in the storage array and storing the third segment of data in the cache memory, the third segment of data being contiguous with and preceding the first segment of data in the video file;

after the fetching of the first, second, and third segments of data from the video file in the storage array and the storing of the first, second, and third segments of data in the cache memory, the video file manager receiving, from the video application, a request for data from the video file beginning at a specified offset in the video file, and the video file manager responding to the request for data by searching the cache memory for data from the video file at the specified offset in the video file and finding that the data from the video file at the specified offset is in the third segment of data in the cache memory, and in response to finding that the data from the video file at the specified offset is in the third segment of data in the cache memory, returning data from the third segment of data in the cache memory to the video application and fetching a fourth segment of data from the video file in the storage array and storing the fourth segment of data from the video file in the cache memory, the fourth segment of data being contiguous with and preceding the third segment of data in the video file;

wherein the video file manager performs a search of cache state information in response to an initial sequence of first and second read requests from the host application for reading data from the video file, and performing the fetching of the first, second, and third segments of data from the video file in the storage array in response to the search of the cache state information finding that the cache state information indicates that: (a) buffers have already been allocated in the cache memory for buffering the first, second, and third segments of the data from the video file, and (b) the buffers do not include the data requested by the second read request, and (c) the initial sequence of the first and second read requests is likely to be the beginning of a sequential access of the video file; and wherein the video file manager determines that the initial sequence of the first and second read requests is likely to be the beginning of a sequential access of the video file upon computing a distance between an offset specified by the first read request and an offset specified by the second read request and comparing the distance to a threshold and finding that the comparison indicates that the initial sequence of the first and second read requests is likely to be the beginning of a sequential access of the video file.

4. A data processing system comprising a host computer and a storage array coupled to the host computer for servicing storage access requests from the host computer, the host computer having a cache memory and being programmed with a video application and a video file manager, the video file manager being executable by the host computer for:

fetching a first segment of data from the video file in the storage array and storing the first segment of data in the cache memory;

fetching a second segment of data from the video file in the storage array and storing the second segment of data in the cache memory, the second segment of data being contiguous with and following the first segment of data in the video file;

fetching a third segment of data from the video file in the storage array and storing the third segment of data in the cache memory, the third segment of data being contiguous with and preceding the first segment of data in the video file;

after the fetching of the first, second, and third segments of data from the video file in the storage array and the storing of the first, second, and third segments of data in the cache memory, for receiving, from the video application, a request for data from the video file beginning at a specified offset in the video file, and for responding to the request for data by searching the cache memory for data from the video file at the specified offset in the video file and finding that the data from the video file at the specified offset is in the third segment of data in the cache memory, and in response to finding that the data from the video file at the specified offset is in the third segment of data in the cache memory, for returning data from the third segment of data in the cache memory to the video application and fetching a fourth segment of data from the video file in the storage array and storing the fourth segment of data from the video file in the cache memory, the fourth segment of data being contiguous with and preceding the third segment of data in the video file;

wherein the video file manager is further executable by the host computer for performing a search of cache state information in response to an initial sequence of first and second read requests from the video application for reading data from the video file, and performing the fetching of the first, second, and third segments of data from the video file in the storage array in response to the search of the cache state information finding that the cache state information indicates that: (a) buffers have already been allocated in the cache memory for buffering the first, second, and third segments of the data from the video file, and (b) the buffers do not include the data requested by the second read request, and (c) the initial sequence of the first and second read requests is likely to be the beginning of a sequential access of the video file; and wherein the video file manager is further executable by the host computer for determining that the initial sequence of the first and second read requests is likely to be the beginning of a sequential access of the video file upon computing a distance between an offset specified by the first read request and an offset specified by the second read request and comparing the distance to a threshold and finding that the comparison indicates that the initial sequence of the first and second read requests is likely to be the beginning of a sequential access of the video file.

5. A data processing system comprising a host computer and a storage array coupled to the host computer for servicing storage access requests from the host computer, the host computer having a cache memory and being programmed with a video application and a video file manager, the video file manager being executable by the host computer for:

fetching a first segment of data from the video file in the storage array and storing the first segment of data in the cache memory;

fetching a second segment of data from the video file in the storage array and storing the second segment of data in the cache memory, the second segment of data being contiguous with and following the first segment of data in the video file;

fetching a third segment of data from the video file in the storage array and storing the third segment of data in the cache memory, the third segment of data being contiguous with and preceding the first segment of data in the video file;

after the fetching of the first, second, and third segments of data from the video file in the storage array and the storing of the first, second, and third segments of data in the cache memory, for receiving, from the video application, a request for data from the video file beginning at a specified offset in the video file, and for responding to the request for data by searching the cache memory for data from the video file at the specified offset in the video file and finding that the data from the video file at the specified offset is in the third segment of data in the cache memory, and in response to finding that the data from the video file at the specified offset is in the third segment of data in the cache memory, for returning data from the third segment of data in the cache memory to the video application and fetching a fourth segment of data from the video file in the storage array and storing the fourth segment of data from the video file in the cache memory, the fourth segment of data being contiguous with and preceding the third segment of data in the video file;

wherein the video file manager is further executable by the host computer for performing the fetching of the first segment of data from the video file in the storage array during a first fetching process in response to an initial read request from the video application for data from the video file, and for returning data requested by the initial read request to the video application after the first segment of data in the cache memory has been loaded into the cache memory; and after the first fetching process, further in response to the initial read request from the video application for data from the video file, for performing the fetching of the second segment of data from the video file in the storage array and storing the second segment of data in the cache memory during a second fetching process that is asynchronous with the return of data requested by the initial read request to the video application, and thereafter, further in response to the initial read request from the video application for data from the video file in the storage array, for performing the fetching of the third segment of data from the video file in the storage array and storing the third segment of data in the cache memory during a third fetching process that is asynchronous with the return of data requested by the initial read request to the video application; and wherein the video file manager is further executable by the host computer for determining that the initial sequence of the first and second read requests is likely to be the beginning of a sequential access of the video file upon computing a distance between an offset specified by the first read request and an offset specified by the second read request and comparing the distance to a threshold and finding that the comparison indicates that the initial sequence of the first and second read requests is likely to be the beginning of a sequential access of the video file.

* * * * *